United States Patent Office 3,319,768
Patented May 16, 1967

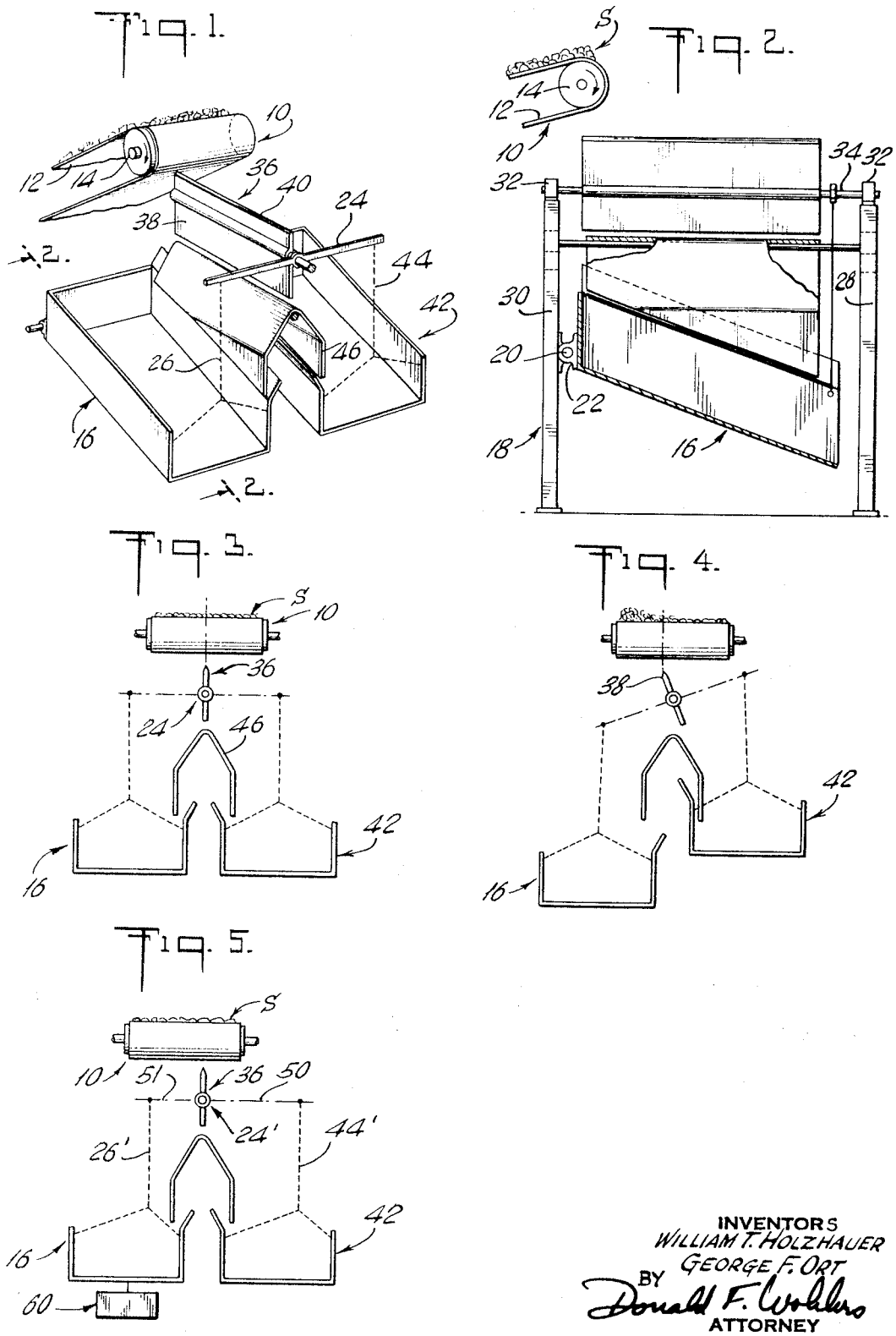

3,319,768
STRUCTURE FOR CONTROLLING THE FLOW OF BULK SOLIDS
William T. Holzhauer, Basking Ridge, and George F. Ort, Murray Hill, N.J., assignors to Esso Research and Engineering Company, a corporation of Delaware
Filed Mar. 18, 1966, Ser. No. 535,503
8 Claims. (Cl. 198—68)

The present invention relates to structure for controlling the flow of bulk solids.

In particular, the invention relates to a structure capable of dividing a stream of bulk solids.

At the present time the available methods and apparatus for dividing a flow of bulk solids involves collecting the solids in a suitable hopper from which the solids are subsequently fed. Inherent in this latter type of structure and operation is of course the stopping of the movement of the solids. In order to provide a division of the solids collected in the hopper it is conventional to feed the solids from the hopper along parallel feeders, the number of feeders being equal to the number of desired flow streams, and of course the bulk solids must be reaccelerated for further travel.

The interruption in the flow of the solids, necessarily inherent in the conventional handling thereof as pointed out above, is highly undesirable because of the power required for initiating the movement of the solids. Moreover, the conventional structures used for the above purposes are relatively complex and expensive, involving such features as feedback controls and the like to achieve predetermined rates of flow of the bulk solids.

It is accordingly a primary object of the invention to provide a structure which is capable of dividing a moving stream of bulk solids in a preselected manner without interrupting the movement of the bulk solids.

In particular, it is an object of the invention to provide a structure capable of splitting a stream of bulk solids into two streams which have a predetermined ratio with respect to each other, while at the same time avoiding any interruption in the movement of the bulk solids.

It is especially an object of the invention to provide a structure of the above type which requires no source of outside power for its operation.

In addition, it is an object of the invention to provide a structure which is not undesirably influenced if the flow of bulk solids should be intermittent rather than continuous.

Moreover, it is an object of the invention to provide a structure where the rate of flow of the solids will have no influence on the operation of the structure and where such complications as feedback controls and the like are completely unnecessary.

The objects of the present invention also include the provision of a structure which is very simple and which can be built as ruggedly as called for by the required service.

Primarily, with the structure of the invention a conveyor means is positioned to receive at least part of a stream of bulk solids directed along a given path by a suitable feeding means. A weight-responsive support means supports the conveyor means for automatic downward movement if the weight of solids on the conveyor means is at any time greater than a given weight, this weight-responsive support means also causing an automatic upward movement of the conveyor means if the weight of solids, moving to a given location and carried by the conveyor, should decrease below the given weight. A deflector means is situated in the path of the stream of solids, in advance of the conveyor means, and is operatively connected with the conveyor means for deflecting a greater portion of the stream to the conveyor means in the event that the latter rises and a lesser portion of the stream to the conveyor means in the event that the latter descends. In this way it is possible to maintain the conveyor means at a predetermined elevation where at any given instant a predetermined weight of the bulk solids is carried by the conveyor means while traveling to a given location.

The invention is illustrated by way of example in the accompanying drawings which form part of the application and in which:

FIGURE 1 is a schematic perspective illustration of one possible embodiment of a structure according to the invention;

FIGURE 2 is a partly sectional side view of the structure of FIGURE 1 taken along line 2—2 of FIGURE 1 in the direction of the arrows and showing part of the framework which carries the elements illustrated in FIGURE 1;

FIGURE 3 is a partly schematic front end view of the structure;

FIGURE 4 show the elements schematically in a position different from that of FIGURE 3, so as to illustrate how the structure of the invention operates; and FIGURE 5 shows a possible variation of the structure, also in a schematic manner.

As is apparent from the above discussion, the structure of the invention is intended to be used with flowing bulk solids. A feeding means 10 is provided for feeding a stream of bulk solids S along a given path. In the illustrated example this feeding means takes the form of simple belt conveyor 12 supported at its ends by a pair of rollers which are driven in any suitable way. Thus, the upper belt-supporting and driving roller 14 is indicated in FIGURES 1 and 2. The stream of solids S is carried by the upper run of the belt 12 and simply falls off the upper end of the belt downwardly toward the right, as viewed in FIGURE 2, so that in this way the feeding means 10 directs the stream of solids S along a predetermined path.

A conveyor means 16 is situated in the path of movement of the stream of solids to receive at least part of this stream. In the illustrated example the conveyor means 16 is a gravity conveyor taking the form of a downwardly inclined chute which is open at its lower end and which is supported at its upper end for swinging movement about a horizontal axis. Thus, it will be seen that a suitable framework 18 (FIGURE 2) supports an elongated horizontal rod 20 extending through a bearing 22 fixed to the rear end of the chute 16, so that in this way the chute or conveyor means 16 is capable of swinging about the horizontal rod 20. Thus, the bulk solids falling onto the chute 16 from the feeding means 10 will be conveyed downwardly toward the right, as viewed in FIGURE 2. The solids simply flow through and from the open lower end of the chute 16 into any suitable receptacle or other receiver situated at the predetermined location to which the bulk solids are directed by the conveyor means 16.

This conveyor means 16 is supported by a weight-responsive support means for downward movement in response to an increase in the weight of the solids carried by the conveyor means 16 at any given instant and for upward movement in response to a decrease in the weight of solids carried by the conveyor means during travel of the solids to the predetermined location to which the solids are directed by the conveyor means 16. This weight-responsive support means includes not only the pivotal support provided by the rod 20 and the bearing 22 but also a balance arm 24 and a flexible connector 26 connecting the balance arm 24 to the lower open end of the chute 16. The frame 18 has a front portion 28 and a rear portion 30 provided at their upper ends with coaxial bearings 32, respectively. These bearings 32 receive and support the ends of an elongated rod 34, so that this rod 34 is in this way supported for rotary movement about its own axis. The rod 34 extends perpendicularly to and fixedly carries the balance arm 24, so that in this way the turning axis of the balance arm 24 coincides with the axis of the rotary rod 34.

The flexible connector 26 is in the form of any suitable chain, cable, or the like having an upper end connected to the balance arm 24 on one side of its horizontal turning axis and having lower ends connected to the opposed side walls of the conveyor means 16, so that the flexible connector 26 has substantially the configuration of an inverted Y.

In accordance with one of the important features of the invention a deflector means 36 is operatively connected to the conveyor means 16 for responding to up and down movement thereof to automatically deflect a lesser or a greater portion of the stream S away from the conveyor 16. In a manner which is described below, a force acts on the balance arm 24 to tend to turn it in a clockwise direction, as viewed in FIGURE 1, in opposition to the tendency of the bulk solids on the conveyor 16 to turn the arm 24 in a counterclockwise direction, as viewed in FIGURE 1, and when a predetermined weight of flowing solids is carried at any given instant by the conveyor 16, there is a condition of equilibrium where the conveyor 16 remains at a predetermined elevation. Should the predetermined weight any given instant increase, then the conveyor 16 will simply swing downwardly, and the deflector means will be automatically actuated to deflect a greater portion of the stream S away from the conveyor 16 so that it will automatically return to its initial elevation. In the same way, if the predetermined weight of solids on the conveyor 16 at any given instant should decrease, the conveyor would automatically swing upwardly and the deflector means 36 would in this case automatically deflect a greater portion of the stream S to the conveyor 16 so that it would again automatically return to its predetermined elevation. In this way the structure operates to maintain in a fully automatic manner a given weight of bulk solids traveling along the conveyor 16 at any given instant.

In the particular example illustrated, the deflector means 36 takes the form of a simple deflector blade 38 having an upper knife edge 40 situated in the path of falling movement of the stream of solids as they flow beyond the end of the feeding means 10 to the conveyor means 16. The blade 38 is fixed to the rod 34 for turning movement therewith and it is perpendicular to the balance arm 24 so that as the latter turns, in response to an increase or decrease in the weight of solids on the conveyor 16 at any given instant, the deflector blade 38 will necessarily turn also so as to achieve the above effect of automatically increasing or decreasing the portion of the stream which is deflected away from the conveyor.

A further feature of the invention resides in situating beside the chute conveyor means 16 a second chute conveyor means 42 which in the illustrated example may be substantially identical with the chute 16. This chute 42 is also supported by the rod 20 for swinging movement about a horizontal axis common with the pivot axis for the chute 16, and the chute 42 has a lower open end connected by a flexible connector 44 with the balance arm 24 on the opposite side of the rod 34 from the connector 26.

The structure is completed by a simple fixed deflector 46 situated beneath the turnable deflector means 36. The fixed deflector 46 has an upper peaked portion terminating in a crest which extends along a straight horizontal line in a vertical plane which includes the turning axis of the balance arm 24 and the deflector 36. Below its peaked portion the fixed deflector 26 has a pair of side walls situated inwardly of the inner side walls of the pair of chutes 16 and 42, as indicated in FIGURE 3. Thus, the solids deflected by the deflector means 36 will necessarily be directed by the fixed deflector 46 into one or the other of the chutes.

FIGURE 3 schematically illustrates the case where the structure of the invention is used for evenly dividing a stream of solids S so that equal weights thereof will be respectively conveyed by the pair of conveyor means 16 and 42. It is to be understood that in the instant description and in the claims which follow the term "predetermined weight" is used to signify not only a given absolute weight but also a given fraction of a total. Thus, the conveyors may be considered as carrying predetermined absolute weights of solids at any given instant or predetermined weights which form a given fraction of the total stream S.

With the structure shown in FIGURE 3 the stream S will be divided into predetermined equal weights which will respectively be simultaneously conveyed by the pair of conveyor means 16 and 42.

The structure is shown in its equilibrium position in FIGURE 3 where the pair of conveyor means are at the same elevation and the balance arm 24 is horizontal. It will be noted that at this time the stream S is fairly evenly distributed across the feeding means 10 so that the parts will remain under these conditions substantially at the equilibrium balanced condition indicated in FIGURE 3. If it should happen, however, that the stream S is unevenly divided between the pair of conveyors, then the structure of the invention will automatically respond to re-establish the equilibrium conditions of FIGURE 3. FIGURE 4 illustrates how these operations are carried out in a fully automatic manner. Thus, assuming that because of a non-uniform distribution of the bulk solids across the feeding means 10 more of the bulk solids become situated over the conveyor 16 than over the conveyor 42, then, in this case, there will initially be an increase in the weight of the solids conveyed by the conveyor means 16 and a decrease in the weight of the solids conveyed by the conveyor means 42. As a result the balance arm 24 necessarily swings in a counterclockwise direction from the position of FIGURE 3 into the position of FIGURE 4. The upper edge 40 of the blade 38 will therefore shift to the left, as viewed in FIGURES 3 and 4, with the deflector blade 38 being inclined downwardly toward the right, since it necessarily remains at all times perpendicular to the balance arm 24. As a result a greater portion of the stream S is deflected to the higher or lighter weight conveyor 42 and a lesser portion will be received by the lower deflector 16, so that the balance arm 24 will now swing in a clockwise direction, and these operations will continue automatically until equilibrium is again achieved.

Of course, it is not essential that the stream S be evenly divided between the conveyors. Thus, FIGURE 5 shows a situation where, for example, one third of the stream is to be conveyed by the conveyor means 42 while two thirds of the stream is to be conveyed by the conveyor means 16. For this purpose it is only necessary to provide an arrangement as shown in FIGURE 5 where the lengths of the lever arms of the balance arm 24' respectively connected with the connectors 26' and 44' have an inverse ratio with respect to the fractions of the stream S to be carried by the pair of conveyors. Thus, in this case the lever arm 50 connecting the flexible connector 44' to the balance arm 24' is twice as long as the lever arm 51 which connects the flexible connector 26' to the balance arm 24'. Also, it will be noted that under the assumption that there will usually be a substantially uniform distribution of the bulk solids across the conveyor the deflector means 36 is situated approximately two thirds of the way across the stream from the left edge thereof, as viewed in FIG. 5.

With an arrangement as shown in FIG. 5 where the pair of conveyors 16 and 42 are substantially identical, the arm 24' will not be horizontal and the conveyors will not be at the same elevation in the initial position of the parts before any solids are received by the conveyors 16 and 42. It is therefore necessary to add to the conveyor which is connected to the shorter lever arm of the balance 24' a tare weight for the purpose of providing the same elevation for the pair of conveyors at the start of the operations. Thus, in the example shown in FIG. 5 a tare weight 60 is schematically illustrated connected to the conveyor 16 which is connected to the shorter lever arm 51 of the balance 24'. The weight 60 is great enough so that when the structure is not used the pair of conveyors 16 and 42 will be at the same elevation.

As was pointed out above, in the illustrated example the pair of conveyors 16 and 42 are substantially identical. The only difference is that at their inside walls, where they extend between the outer side walls of the fixed deflector 46, the upper edges of these inside walls of the chutes are oppositely inclined toward each other, as indicated in FIGS. 3–5.

Except for this difference, the pair of conveyors 16 and 42 are identical, so that the structure of the invention not only is quite simple and rugged, as is apparent from the above description, but in addition it does not require a large number of differently constructed elements.

It is to be noted that with the structure of the invention there is no interruption in the flow of the bulk solids so that in this way there is a considerable saving of power, as compared to arrangements where the flow is interrupted. In fact, there is absolutely no requirement of any external source of power with the structure of the invention. The device is mechanically simple and can easily be built as ruggedly as called for by the particular service which is required. Furthermore, the rate of flow of the stream S before it reaches the conveyors 16 and 42 will have no influence on the operation, and, in fact, if the flow should be intermittent rather than continuous, the structure of the invention will still operate perfectly. It will be seen that absolutely no feedback controls to other equipment are required, irrespective of the operation of the device at any rate from zero to maximum.

It is apparent that the structure described above can have many uses. It can be used, for example, in proportioning the solids which are fed to a multiplicity of retorts, as in oil-shale processing. Other possible applications, among many, could be in asphalt-soil building block manufacture, or the like, and in the fertilizer field.

With respect to the arrangement shown in FIG. 5, it is apparent either that a different balance arm 24' may be used to provide the arrangement shown in FIG. 5, and the entire framework 18 together with the structure carried thereby can be shifted with respect to the feeding means 10, or in addition to the latter shifting the balance arm can be adjustable. For example, on opposite sides of the rod 34 the balance arm can have telescoped sections which can be pulled out or pushed in so as to provide lever arms 50 and 51 of selected lengths, and of course the flexible cables can easily be connected at different points to the side walls of the chutes to provide an arrangement as indicated in FIG. 5.

While specific embodiments of the invention have been shown and described in detail to illustrate the application of the inventive principles, it will be understood that the invention may be embodied otherwise without departing from such principles.

What is claimed is:

1. A flow divider for a stream of bulk solids traveling along a given path and having an irregular distribution across the width of said path, comprising chute means intersecting said path for receiving a part of the width of said stream of bulk solids and for conveying the received part of the stream to a predetermined location, so that said chute means will at any given instant during its operation have thereon a predetermined proportion of the bulk solids traveling to said predetermined location, weight-responsive support means supporting said chute means for downward movement in response to an increase in weight upon said said chute and for upward movement in response to a decrease in weight upon said chute, and deflector means situated in the path of the stream of bulk solids in advance of said chute means for deflecting a proportional part of said stream away from said chute means, said deflector means being operatively connected with said chute means for responding automatically to downward movement of said chute means for deflecting a greater portion of the stream away from said chute means and to upward movement of said chute means for deflecting a lesser portion of the stream away from said chute means, so that said chute means is automatically maintained at a position to direct a predetermined proportion of the bulk solids traveling in said stream to said predetermined location.

2. The combination of claim 1 and wherein a second chute means is situated adjacent the first-mentioned chute means for receiving the part of said stream which is deflected by said deflector means away from said first chute means.

3. The combination of claim 2 and wherein said support means also supports said second chute means for automatic up and down movement in response to a decrease and increase in the weight ratio of bulk solids thereon at any given instant, and said deflector means also being operatively connected with said second chute means for responding to up and down movement thereof from a given elevation for respectively increasing and decreasing the portion of said stream which is deflected to said second chute means by said deflector means, so that a predetermined proportion of the bulk solids will be automatically maintained in movement on said second chute means at any given instant.

4. The combination of claim 3 and wherein said support means includes an elongated balance arm supported intermediate its ends for free turning movement about a horizontal axis, and a pair of connectors respectively situated on opposite sides of said axis and connecting said balance arm to the two chute means, respectively, for providing through said balance arm simultaneous opposed changes in elevation of both chute means, whereby the predetermined weights of solids carried by both of said conveyor means, respectively, at any given instant will be predetermined fractions of said stream.

5. The combination of claim 4 and wherein said traveling stream of solids drop onto the two chute means, and said deflector means being situated in the path of falling movement of the stream and being operatively connected with said balance arm for turning movement with the latter about said axis, said deflector means being in the form of a deflector blade perpendicular to said balance arm and including the axis of turning thereof.

6. The combination of claim 5 and wherein the two chute means are respectively situated on opposite sides of a vertical plane which includes the axis of turning of said balance arm and said two chute means respectively being in the form of a pair of downwardly inclined chutes which are pivotally supported distant from said pair of connectors for swinging movement upwardly and downwardly in response to a decrease and increase in the weight ratio of bulk solids on said chutes at any given instant.

7. The combination of claim 6 and wherein said chutes are inclined in the same direction and are supported for swinging movement about a common horizontal pivot axis perpendicular to the vertical plane which includes the axis of turning of said arm.

8. The combination of claim 7 and wherein the common pivot axis of said chutes extends along adjoining ends of said chutes, said chutes being inclined downwardly in the same direction from said common pivot axis thereof and said chutes respectively having distant from said common pivot axis thereof opposed ends which are respectively connected by the pair of connectors to said balance arm.

References Cited by the Examiner

UNITED STATES PATENTS

| 270,821 | 1/1883 | Lynch | 177—99 |
| 3,022,843 | 2/1962 | Watson et al. | 177—98 |

EVON C. BLUNK, *Primary Examiner.*

SAMUEL F. COLEMAN, *Examiner.*

M. L. AJEMAN, *Assistant Examiner.*